US009472959B2

(12) United States Patent
Johnson et al.

(10) Patent No.: US 9,472,959 B2
(45) Date of Patent: Oct. 18, 2016

(54) SYSTEMS AND METHODS FOR BALANCING A VEHICLE BATTERY SYSTEM

(71) Applicant: GM GLOBAL TECHNOLOGY OPERATIONS LLC, Detroit, MI (US)

(72) Inventors: Kurt M. Johnson, Brighton, MI (US); Robert C. Baraszu, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 718 days.

(21) Appl. No.: 13/690,270

(22) Filed: Nov. 30, 2012

(65) Prior Publication Data

US 2014/0152232 A1 Jun. 5, 2014

(51) Int. Cl.
*H02J 7/00* (2006.01)
*B60L 11/18* (2006.01)
*B60L 3/00* (2006.01)
*H01M 10/42* (2006.01)

(52) U.S. Cl.
CPC ............ *H02J 7/0014* (2013.01); *B60L 3/0046* (2013.01); *B60L 11/1859* (2013.01); *B60L 11/1861* (2013.01); *B60L 11/1866* (2013.01); *B60L 11/1887* (2013.01); *B60L 2200/10* (2013.01); *B60L 2200/32* (2013.01); *B60L 2240/545* (2013.01); *B60L 2240/547* (2013.01); *B60L 2240/549* (2013.01); *B60L 2260/44* (2013.01); *H01M 2010/4271* (2013.01); *Y02T 10/7044* (2013.01); *Y02T 10/7061* (2013.01); *Y02T 90/34* (2013.01)

(58) Field of Classification Search
CPC .......................................... H01M 2010/42771
USPC ......................................................... 320/103
See application file for complete search history.

(56) References Cited

U.S. PATENT DOCUMENTS

| 7,245,108 | B2 * | 7/2007 | Chertok et al. ............... 320/132 |
| 8,143,854 | B2 * | 3/2012 | Maegawa et al. ............ 320/125 |
| 2009/0125256 | A1 * | 5/2009 | Aridome ........................ 702/63 |
| 2010/0019724 | A1 * | 1/2010 | Mizutani et al. ............. 320/118 |
| 2012/0187898 | A1 * | 7/2012 | Nysen ........................... 320/103 |
| 2012/0268070 | A1 * | 10/2012 | Park et al. .................... 320/126 |
| 2012/0290234 | A1 * | 11/2012 | Schaefer ......................... 702/63 |
| 2013/0257377 | A1 * | 10/2013 | Diamond et al. ............ 320/118 |

FOREIGN PATENT DOCUMENTS

CN 102577017 A 7/2012

OTHER PUBLICATIONS

CN102577017A Machine Translation.

* cited by examiner

*Primary Examiner* — Drew A Dunn
*Assistant Examiner* — Jerry D Robbins
(74) *Attorney, Agent, or Firm* — Phillips Ryther & Winchester; John P. Davis

(57) ABSTRACT

System and methods for balancing a vehicle battery system are presented. In certain embodiments, a method for balancing battery system having multiple battery sections may include receiving estimated states of charge of the battery sections. Based on the estimated states of charge, a determination may be made whether the battery sections have states of charge within one of plurality of regions included in a state of charge window. Based on the determination, one of a plurality of different balancing algorithms may be utilized to control transfer energy between the battery sections to balance the battery sections.

10 Claims, 3 Drawing Sheets

SYSTEMS AND METHODS FOR BALANCING A VEHICLE BATTERY SYSTEM

TECHNICAL FIELD

This disclosure relates to systems and methods for balancing a battery system in a vehicle. More specifically, but not exclusively, this disclosure relates to systems and methods for balancing difference sections of a vehicle battery pack based on an estimated state of charge of the various sections.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like).

In certain designs, battery systems included in a vehicle may include one or more sections. For example, a vehicle battery system may include a battery pack that comprises one or more sections of battery cells. Battery sections may be replaced and/or added in a battery pack, resulting in differences in capacities, state of charge, discharge rates, impedances, and/or voltages between the new battery sections and the existing battery sections. Similarly, a battery cell may be replaced and/or added in a battery section, resulting in differences in capacities, state of charge, discharge rates, impedances, and/or voltages between the new battery cell and the existing battery cells. Battery discharge may terminate when a section having the lowest capacity is depleted, regardless of whether other battery sections have sufficient capacity for sustained discharge. This behavior may result in battery system inefficiencies, degradation, and/or permanent damage.

SUMMARY

Systems and methods are presented for balancing a one or more sections of battery system included in a vehicle. In certain embodiments, a system for battery balancing may include a battery system including a plurality of battery sections. Each section of the plurality of battery sections may include a plurality of cells. A plurality of sensors may be coupled to the plurality of cells and be configured to provide estimations of states of charge for each of the plurality of section/cells (e.g., using voltage measurements or the like). A cell balancing system may be coupled to the plurality of cells and be configured to redistribute energy between the cells. Battery control electronics may be coupled to the sensors and the cell balancing system. Consistent with embodiments disclosed herein, the battery control electronics may be configured to cause the cell balancing system to balance the battery sections (e.g., cells within the battery sections) according to one of a plurality of different balancing algorithms based on estimated states of charge for the plurality of sections/cells provided by the plurality of sensors.

In further embodiments, a method for balancing a plurality of sections included in a battery system may include receiving estimated states of charge of the plurality of sections of the battery system. States of charge may be estimated by one or more sensors associated with one or more of the battery sections/cells using, for example, voltage measurements. Based on the estimated states of charge, it may be determined the battery is unbalanced. In certain embodiments, determining whether the battery is unbalanced may include comparing the estimated states of charge to determine whether the battery sections are balanced/unbalanced.

If battery balancing is required, it may be determined whether the estimated states of charge are within one of a first state of charge region, a second state of charge region, and a third state of charge region. The first state of charge region may include higher states of charge above a particular threshold, the second state of charge region may include states of charge below a particular threshold, and the third state of charge region may include states of charge between the first and second regions. Based on the determination, the plurality of sections of the battery systems may be balanced according to one of a plurality of different balancing algorithms.

In yet further embodiments, a method for balancing a plurality of sections included in a battery system may include receiving estimated states of charge of the plurality of sections of the battery system. Based on the estimated states of charge, it may be determined that the plurality of sections of the battery system are unbalanced. A determination may be made whether the estimated states of charge are below a threshold. Based on the determination, a weak section of the plurality of sections may be balanced together with sections of the plurality of sections having a state of charge lower than the weak section and sections of the plurality of sections having a state of charge higher than the weak section may be balanced independently.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
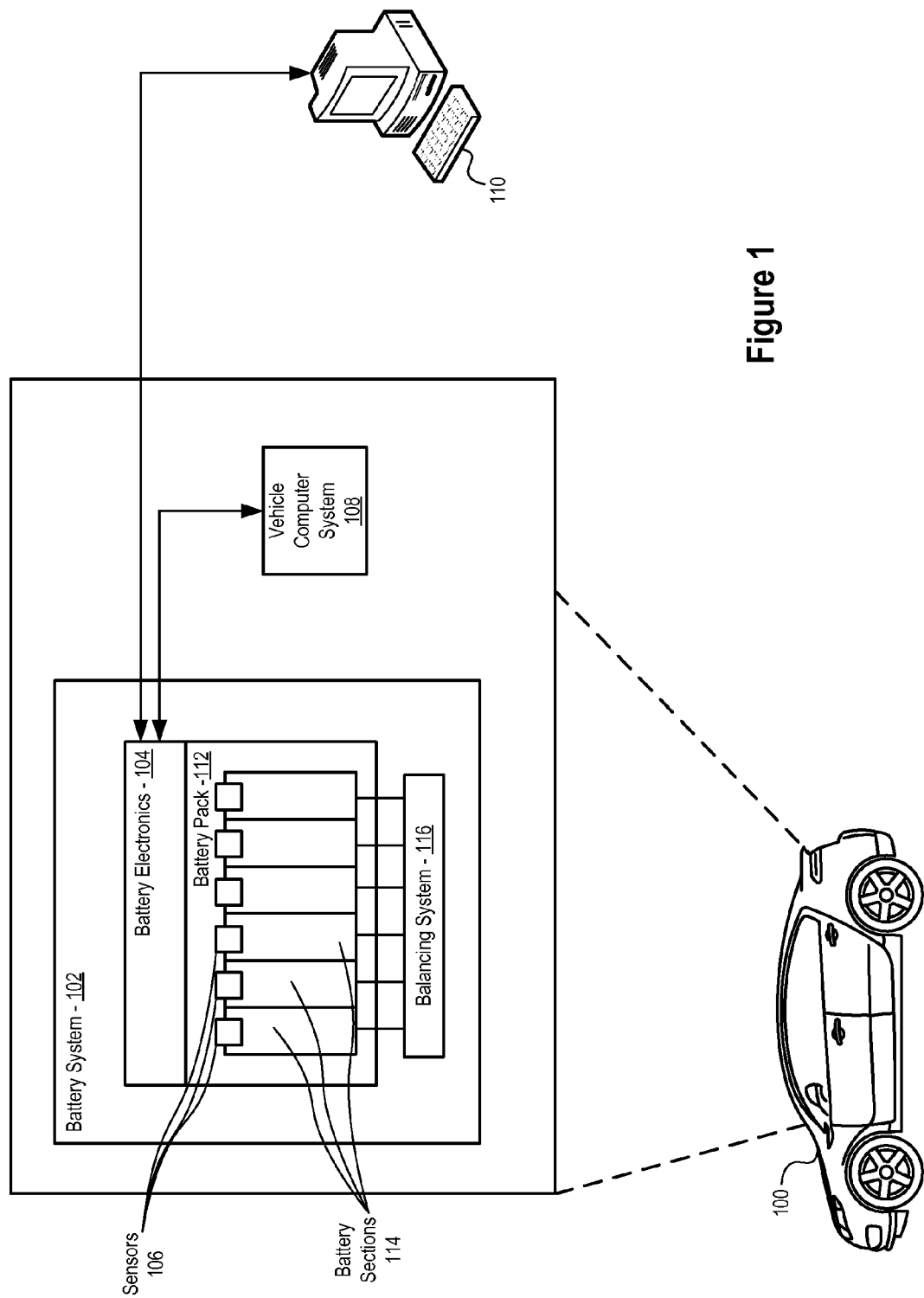
FIG. 1 illustrates an exemplary system for balancing a battery system in a vehicle consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may utilize one or more methods to balance different sections of a battery system depending on the state of charge of the sections. As used herein, a battery section may refer to any subset of a battery system including, for example, one or more battery cells included in the system. Balancing the sections of the battery system may be achieved by transferring energy from or to individual cells until a state of charge of a section with the lowest capacity is equal to and/or substantially equal to the state of charge of the battery system. To balance an individual section of a battery pack, one or more battery cells included in the section may be balanced. To balance multiple sections of the battery pack together, the battery cells included in the multiple sections may all be balanced as a group. Accordingly, as used herein, balancing a section or sections includes balancing one or more constituent battery cells of the section or sections. Properly balancing a battery system may increase the lifetime of the battery system and may prevent over and/or undercharging conditions.

Systems and methods disclosed herein may estimate a state of charge of one or more battery sections included in a battery system. Based on whether the estimated states of charge fall within one or more defined regions, different battery balancing methods may be utilized. Utilizing different balancing methods based on whether estimated battery section states of charge fall within one or more defined regions may improve battery balancing operations over utilizing a single balancing method regardless of estimated states of charge.

FIG. 1 illustrates an exemplary system for balancing a battery system in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, a FC drivetrain, and/or any other type of drivetrain suitable for incorporating the systems and methods disclosed herein. The vehicle 100 may include a battery system 102 that, in certain embodiments, may be a HV battery system. The HV battery system may be used to power electric drivetrain components (e.g., as in an electric, hybrid, or FC power system). In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The battery system 102 may include battery electronics 104. The battery electronics 104 may be configured to monitor and control certain operations of the battery system 102. For example, the battery electronics 104 may be configured to monitor and control charging, discharging, and/or balancing operations of the battery system 102. In certain embodiments, the battery electronics 104 may be communicatively coupled with one or more sensors (e.g., sensors 106), actuation devices (e.g., electrical relays), and/or systems configured to enable the battery electronics 104 to monitor and control operations of the battery system 102. The battery electronics 104 may further be configured to provide information to and/or receive information from other systems included in the vehicle 100. For example, the battery electronics 104 may be communicatively coupled with an internal vehicle computer system 108 and/or an external computer system 110 (e.g., via a wireless telecommunications system or the like). In certain embodiments, the battery electronics 104 may be configured, at least in part, to provide information regarding the battery system 102 to a user of the vehicle 100, vehicle computer system 108, and/or external computer system 110. Such information may include, for example, battery state of charge information, battery operating time information, battery operating temperature information, and/or any other information regarding the battery system 102.

The battery system 102 may include one or more battery packs 112 suitably sized to provide electrical power to the vehicle 100. Each battery pack 112 may include one or more battery sections 114. The battery sections 114 may comprise one or more battery cells utilizing any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. To balance an individual section 114 of battery pack 112, one or more battery cells included the section 114 may be balanced. To balance multiple sections 114 of the battery pack 112 together, the battery cells included in the multiple sections may all be balanced as a group. Accordingly, as used herein, balancing a section or sections 114 may include balancing one or more constituent battery cells of the section or sections 114.

Each battery section 114 and or cells included in the battery sections 114 may be communicatively coupled to a cell balancing system 116. Cell balancing system 116 may be configured to selectively transfer energy from or to individual cells included in battery sections 114. For example, cell balancing system 116 may include a network of switches and/or gates configured to facilitate selective energy transfer between cells of battery sections 114. In certain embodiments, each section 114 may be associated with a discrete cell balancing system 116 configured to facilitate selective energy transfer between its constituent cells. In further embodiments, multiple sections 114 may be associated with a single cell balancing system 116. Certain functionality of the cell balancing system 116 may be controlled by battery electronics 104, vehicle computer system 108, and/or computer system 110.

Each battery section 114 may be associated with a sensor 106 configured to estimate a state of charge of an associated battery section 114 using, for example, voltage measurements. Although FIG. 1 illustrates separate sensors 106 associated with each battery section 114, in some embodiments a single sensor configured to estimate a state of charge of a plurality of sections 114 may also be utilized. State of charge information estimated by sensors 106 (e.g., using measured voltages and/or any other suitable measured information) may be provided to battery electronics 104. Using the estimated state of charge information, battery electronics 104 and/or any other suitable system may coordinate battery balancing operations as detailed below.

In certain embodiments, battery balancing operations may be performed upon startup of the vehicle 100, vehicle computer 108, and/or battery system 102. In other embodiments, battery balancing operations may be performed when the vehicle 100 and/or battery system 102 are not in use. In further embodiments, battery balancing operations may be performed upon the installation of a new battery section 114 and/or the replacement of an old battery section 114. Battery balancing may begin by determining whether estimated states of charge of a plurality of battery sections 114 are the same or within a particular range. If so, the plurality of battery sections 114 are balanced. If the battery sections 114 are balanced, balancing operations may not be required. If, however, the battery sections 114 are unbalanced, balancing operations may proceed.

As discussed in more detail below in reference to FIG. 2, a state of charge window representing varied states of charge for one or more battery sections 114 may be defined that includes three state of charge regions. The first region may include higher states of charge having a lower bound at a first threshold. A charge termination level for the battery system 102 may be included within the first region. The second region may include lower states of charge having an upper bound at a second threshold. A charge sustaining level for the battery system 102 may be included within the second region. The third region may include states of charge falling between the first and second regions (e.g., between the first and second thresholds). Accordingly, estimated states of charge of the battery sections 114 fall within one of three defined state of charge regions. In certain embodiments, thresholds defining the regions may be determined by one or more calibrations of a battery system. For example, a SOC near the charge termination level (e.g., the first region) may occur when an estimated state of charge is within a certain tolerance range of a target state of charge during a charge. Consistent with embodiments disclosed herein, different battery balancing methods may be employed based on particular region that the estimated states of charge for the battery sections 114 fall within.

Using the state of charge information estimated by sensors 106 and/or other information received from other sensor systems, a weak section of the battery sections 114 may be identified. In certain embodiments, a weak section may be identified based on a determination that a section has higher impedance or resistance. For example, in addition to state of charge information, battery electronics 104 may receive information regarding estimated internal resistances of the plurality of battery sections 114 from one or more sensors (not shown) associated with the battery sections 114. Based on the estimated internal resistances, a weak section may be identified. Any other suitable method for identifying a weak section may also be utilized (e.g., by determining a section has reduced capacity, temperature variations outside of certain tolerances, and/or the like). In certain embodiments, a plurality of battery parameters may be utilized in identifying a weak section and/or cell.

When estimated states of charge for the sections 114 fall within the first state of charge region (e.g., near the charge termination level), battery balancing may be performed by balancing all sections 114 together. In certain embodiments, balancing all sections 114 together in the first region may result in a higher average voltage of the battery pack 112 during subsequent discharge, thereby providing increased energy delivery by the battery system 102. For example, balancing all battery sections 114 together may provide increased energy delivery by the battery system 102 following a replacement of one of sections 114 when compared to energy delivery by the battery system 102 prior to the section replacement.

When estimated states of charge for the sections 114 fall within the second state of charge region (e.g., near the charge sustaining level), battery balancing may be performed by balancing any of sections 114 having a state of charge lower than the identified weak section together with the weak section, and balancing any of sections 114 having a state of charge higher than the identified weak section individually. In certain circumstances, an identified weak section (e.g., a section identified as having the highest internal resistance) may not have the lowest state of charge relative other sections 114. Accordingly, by balancing any sections having a state of charge lower than the weak section together with the weak section, over discharge of the lower sections may be mitigated, particularly in circumstances when the weak section may be utilized by battery electronics 104 as a control indication of when to terminate discharging from the battery pack 112. Over discharge of battery sections may result in permanent damage to the battery sections and, accordingly, mitigating and/or preventing over discharge conditions is desirable.

Finally, when estimated states of charge for the sections 114 fall within the third state of charge region, all battery sections 114 may be balanced individually. By balancing all battery sections 114 individually in the third state of charge region, the cells within the sections 114 will remain independently balanced (e.g., intra-section balance) so as not to disrupt inter-section balance of the sections 114 near the charge termination level once the battery is recharged. Utilizing different balancing methods based on whether estimated battery section states of charge fall within one of the three regions may improve battery balancing operations over utilizing a single balancing method regardless of estimated states of charge, particularly in the second region where over discharge of sections lower than a weak section may otherwise occur.

In certain embodiments, information regarding battery balancing operations may be provided by battery electronics 104 to vehicle computer system 108, and/or external computer system 110. For example, an indication regarding the balance/imbalance between one or more battery sections 114 and/or battery pack 112 of battery system 102 may be provided. With this information, a user of the vehicle 100 and/or external computer system 110 may diagnose potential problems with battery system 102, monitor the effectiveness of balancing operations, and/or perform any other suitable diagnostic, monitoring, and/or control activities.

Figure 2:
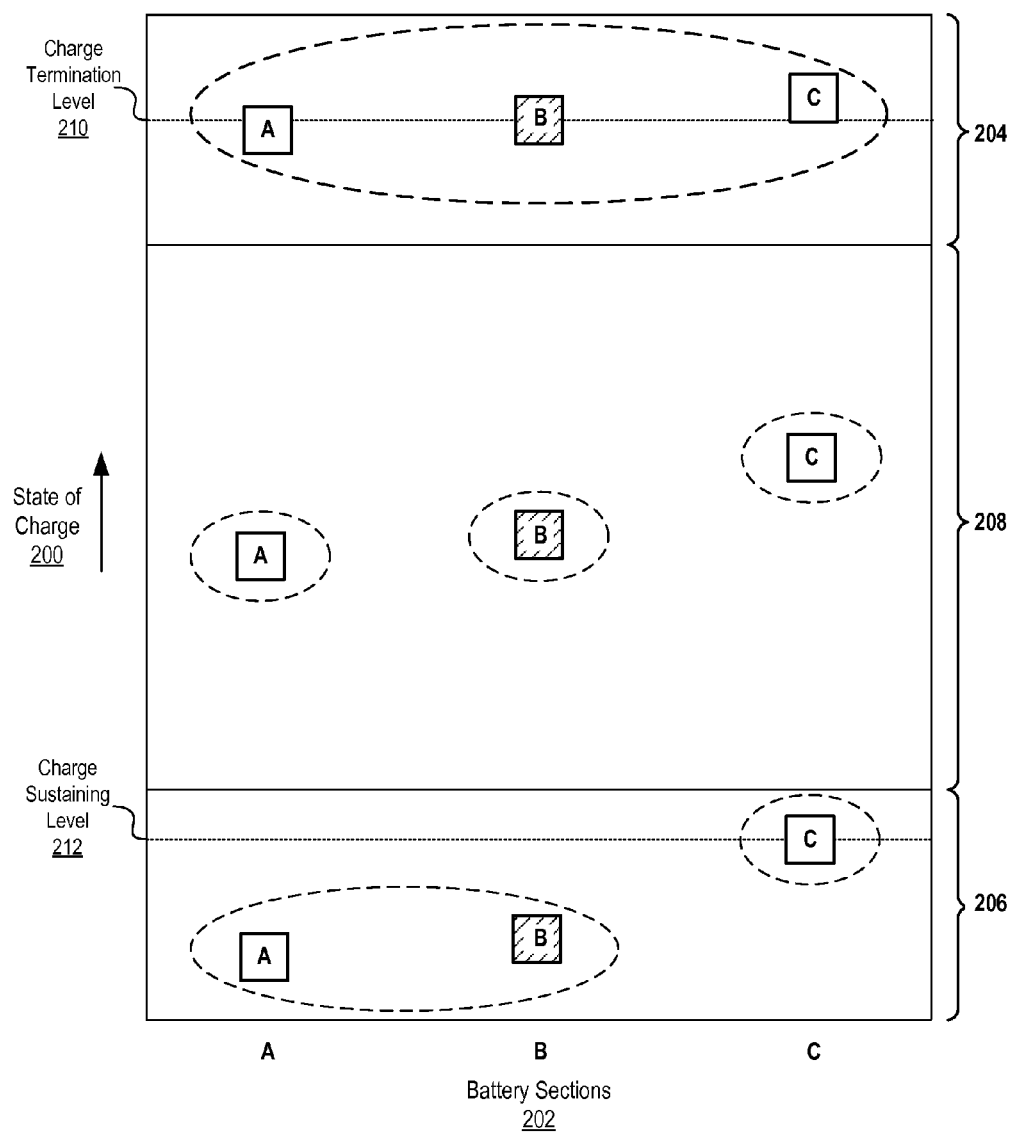
FIG. 2 is a conceptual graph illustrating exemplary methods for balancing a battery system consistent with embodiments disclosed herein.

FIG. 2 is a conceptual graph illustrating exemplary methods for balancing a battery system consistent with embodiments disclosed herein. Particularly, the graph of FIG. 2 illustrates a state of charge window representing varied states of charge 200 for exemplary sections 202 (e.g., sections A, B and C) under three different states of charge conditions. The exemplary state of charge window includes three state of charge regions: a first region 204, a second region 206, and a third region 208. As discussed above, different battery balancing methods may be employed based on the particular region that estimated states of charge 200 for the battery sections 202 fall within.

As illustrated, the first region 204 may include higher states of charge 200, the second region 206 may include lower states of charge 200, and the third region 208 may include states of charge 200 falling between the first and second regions 204, 206. A charge termination level 210 for the battery system may be included within the first region 204. A charge sustaining level 212 for the battery system may be included within the second region 206.

Section B of the exemplary sections 202 illustrated in FIG. 2 may be identified as a weak section of a battery system including sections A, B, and C. As discussed above, when estimated states of charge 200 for the sections 202 fall within the first region 204 (e.g., near the charge termination level 210), battery balancing may be performed by balancing all sections 202 together. Accordingly, as illustrated, in the first region 204, sections A, B, and C may be balanced together. When estimated states of charge 200 for the sections 202 fall within second region 206 (e.g., near the charge sustaining level 212), battery balancing may be performed by balancing any of sections 202 having a state of charge lower than the identified weak section together with the weak section, and balancing any of sections having a state of charge higher than the identified weak section individually. Accordingly, in the second region 206, sections A and B may be balanced together and section C may be balanced individually. When estimated states of charge 200 for the sections 202 fall within the third region 208, all battery sections 202 may be balanced individually. Accordingly, in the third region 208, sections A, B, and C may be balanced individually. Utilizing different balancing methods based on whether estimated states of charge 200 of sections 202 fall within one of the three regions 204-208 may improve battery balancing operations over utilizing a single balancing method regardless of estimated states of charge 200. Improvements may be realized in the second region 206, in particular, where over discharge of sections lower than a weak section may otherwise occur.

Figure 3:
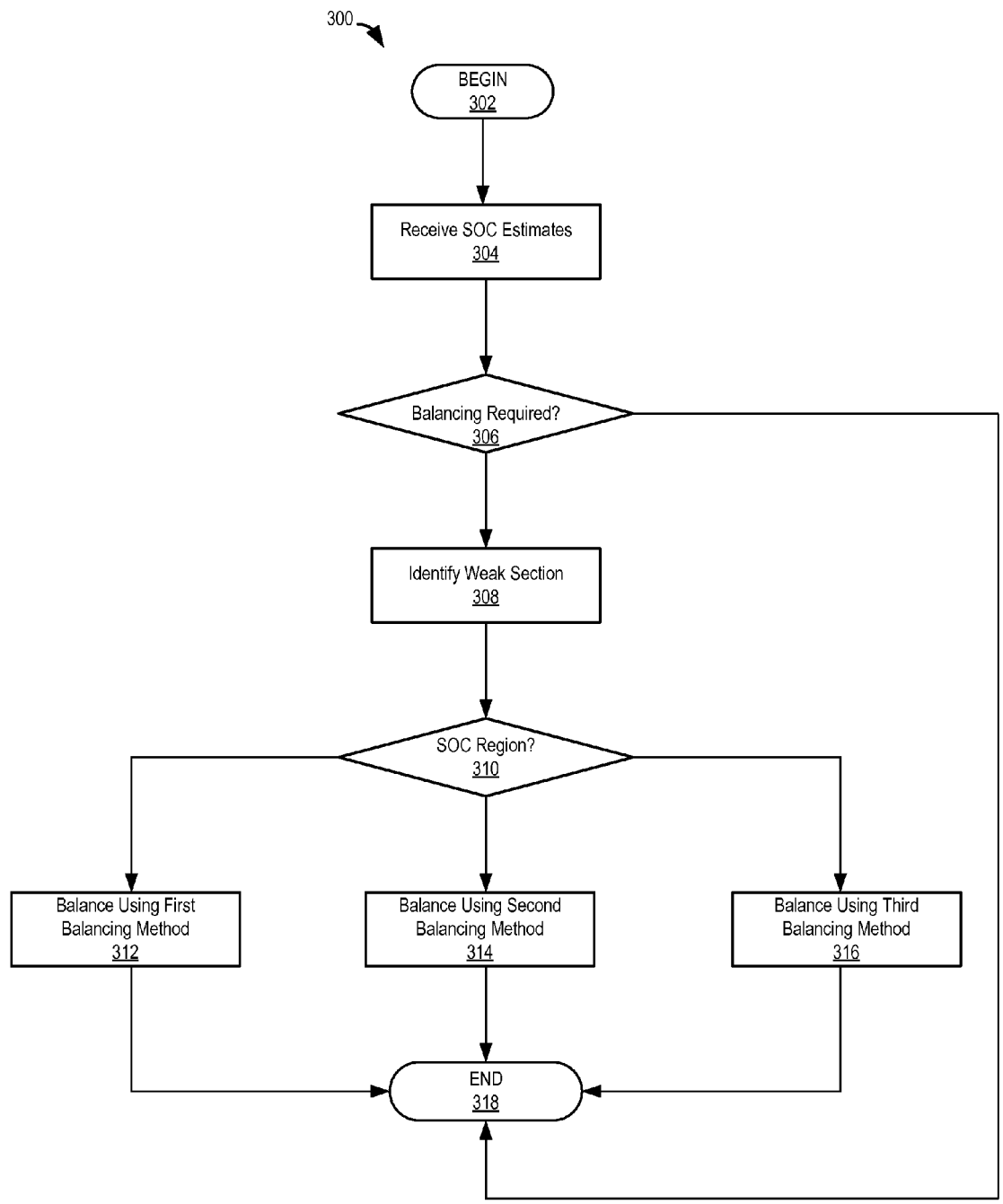
FIG. 3 illustrates a flow chart of an exemplary method for balancing a battery system in a vehicle consistent with embodiments disclosed herein.

FIG. 3 illustrates a flow chart of an exemplary method 300 for balancing a battery system in a vehicle consistent with embodiments disclosed herein. The illustrated method 300 may be performed using, at least in part, battery electronics, a cell balancing system, a vehicle computer system, an external computer system. At 302, the method 300 may be initiated. At 304, state of charge estimates associated with a plurality of battery sections of a battery system may be received. In certain embodiments, the state of charge estimates may be received from one or more sensors associated with the plurality of battery sections.

At 306, based on the received state of charge estimates, a determination may be made whether the plurality of battery sections require balancing. In certain embodiments, the determination may be made by determining that estimated states of charge of the plurality of battery sections are not the same or are not within a particular range. If the state of charge estimates associated with the plurality of battery sections are the same, or are within a particular range, battery balancing operations may not be required (e.g., the battery may be already balanced) and the method 300 may terminate at 318. If the state of charge estimates are not the same or within the particular range, the method 300 may proceed to 308.

At 308, a weak section of the plurality of battery sections may be identified. In certain embodiments, a weak section may be identified based on a determination that a section has a higher impedance or resistance than other sections (e.g., using information received from one or more sensors estimating resistance or the like). At 310, a determination may be made whether the state of charge estimates associated with the plurality of battery sections fall within one of three regions in a state of charge window. As discussed above, a first region may include higher states of charge, a second region may include lower states of charge, and a third region may include states of charge falling between the first and second regions. The charge termination level for the battery system may be included within the first region and the charge sustaining level for the battery system may be included within the second region. Based on the region in which the state of charge estimates for the battery sections fall, one of three balancing methods and/or algorithms may be utilized.

When estimated states of charge for the plurality of battery sections fall within the first region, the method 300 may proceed to 312, where battery balancing may be performed by balancing all sections together. When estimated states of charge for the plurality of battery sections fall within the second region, the method 300 may proceed to 314. At 314, battery balancing may be performed by balancing any of sections having a state of charge lower than the identified weak section together with the weak section, and balancing any of sections having a state of charge higher than the identified weak section individually. Finally, when estimated states of charge for the sections fall within the third state of charge region, the method may proceed to 316. At 316, all battery sections may be balanced individually. By utilizing different balancing methods based on the estimated states of charge of the battery sections, battery balancing operations may be improved.

In certain embodiments, the systems and methods disclosed herein may be implemented, at least in part, using one or more computer systems. For example, certain features and functionality of the battery electronics, vehicle computer system, and/or external computer system may be implemented using a computer system. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. For example, in certain embodiments, the sensors may be configured to also incorporate features allowing measurement of internal battery section resistances. Similarly, the battery electronics may be configured to incorporate certain features and/or functionality of the cell balancing system. Similarly, certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
  a battery system comprising a plurality of battery sections, each section of the plurality of sections comprising a plurality of cells;
  a plurality of sensors coupled to the plurality of cells configured to estimate states of charge for each of the plurality of sections;
  a cell balancing system coupled to the plurality of sections configured to redistribute energy between the plurality of cells;
  battery control electronics communicatively coupled to the plurality of sensors and the cell balancing system, the battery control electronics being configured to cause the cell balancing system to balance the battery sections according to one of a plurality of different balancing algorithms, the one balancing algorithm being selected from the plurality of different balancing algorithm based on estimated states of charge for the plurality of sections provided by the plurality of sensors; and
  a plurality of resistance estimation sensors coupled to the plurality of sections and the battery control electronics configured to estimate an internal resistance of each of the plurality of sections,
  wherein the battery control electronics are further configured to:
    identify a weak section of the plurality of battery sections based on the estimated internal resistance, the weak section having a higher internal resistance than other sections of the plurality of battery sections;
    determine whether estimated states of charge for the plurality of sections are each within one a first state of charge region, a second state of charge region, and a third state of charge region, the second state of charge region comprising states of charge below a second threshold and including a charge sustaining level for the battery system, and to
    cause the cell balancing system to balance the plurality of sections according to a second balancing algorithm of the plurality of balancing algorithms when the estimated states of charge are within the second state of charge region, the second balancing algorithm comprising:
      balancing the weak section of the plurality of sections together with sections of the plurality of sections having a state of charge lower than the weak section; and
      balancing sections of the plurality of sections having a state of charge higher than the weak section independently.

2. The system of claim 1, wherein the first state of charge region comprises states of charge above a first threshold and includes a charge termination level for the battery system.

3. The system of claim 2, wherein battery control electronics are configured to cause the cell balancing system to balance the plurality of sections according a first balancing algorithm of the plurality of balancing algorithms when the estimated states of charge are within the first state of charge region, the first balancing algorithm comprising balancing the plurality of sections together.

4. The system of claim 1, wherein the third state of charge region comprises states of charge between the first state of charge region and the second state of charge region.

5. The system of claim 4, wherein the battery control electronics are configured to cause the cell balancing system to balance the plurality of sections according a third balancing algorithm of the plurality of balancing algorithms when the estimated states of charge are within the third state of charge region, the third balancing algorithm comprising balancing each of the plurality of sections independently.

6. A method for balancing a plurality of sections included in a battery system comprising:
  receiving estimated states of charge of the plurality of sections of the battery system;
  determining that the plurality of sections of the battery system are unbalanced;
  receiving estimated internal resistances of the plurality of battery sections;
  identifying, based on the estimated internal resistances, a weak section of the plurality of battery sections, the weak section comprising a section of the plurality of battery sections having a highest estimated internal resistance of the plurality of battery sections;

determining whether the estimated states of charge are within one of a first state of charge region, a second state of charge region, and a third state of charge region;

selecting a balancing algorithm from a plurality of different balancing algorithms based on the determination of whether the estimated states of charge are within the first state of charge region, the second state of charge region, or the third state of charge region, each balancing algorithm of the plurality of balancing algorithms being associated with one of the first state of charge region, the second state of charge region, or the third state of charge region; and balancing the plurality of sections of the battery system according to the selected battery algorithm, wherein the second state of charge region comprises states of charge below a second threshold and includes a charge sustaining level for the battery system; and wherein the plurality of sections of the battery system are balanced according to a second balancing algorithm of the plurality of balancing algorithms when the estimated states of charge are within the second state of charge region, the second balancing algorithm comprising:

balancing the weak section of the plurality of sections together with sections of the plurality of sections having a state of charge lower than the weak section; and balancing sections of the plurality of sections having a state of charge higher than the weak section independently.

7. The method of claim 6, wherein the first state of charge region comprises states of charge above a first threshold and includes a charge termination level for the battery system.

8. The method of claim 7, wherein the plurality of sections of the battery system are balanced according to a first balancing algorithm of the plurality of balancing algorithms when the estimated states of charge are within the first state of charge region, the first balancing algorithm comprising balancing the plurality of sections together.

9. The method of claim 6, wherein the third state of charge region is between the first state of charge region and the second state of charge region.

10. The method of claim 9, wherein the plurality of sections of the battery system are balanced according to a third balancing algorithm of the plurality of balancing algorithms when the estimated states of charge are within the third state of charge region, the third balancing algorithm comprising balancing each of the plurality of sections of the battery system independently.

* * * * *